(12) United States Patent
Bookbinder et al.

(10) Patent No.: US 7,697,809 B2
(45) Date of Patent: Apr. 13, 2010

(54) POLARIZATION MAINTAINING AND SINGLE POLARIZATION OPTICAL FIBER

(75) Inventors: Dana Craig Bookbinder, Corning, NY (US); Xin Chen, Corning, NY (US); Joohyun Koh, Painted Post, NY (US); Ming-Jun Li, Horseheads, NY (US); Daniel Aloysius Nolan, Corning, NY (US)

(73) Assignee: Corning Incorporated, Corning, NY (US)

( * ) Notice: Subject to any disclaimer, the term of this patent is extended or adjusted under 35 U.S.C. 154(b) by 113 days.

(21) Appl. No.: 12/220,268

(22) Filed: Jul. 23, 2008

(65) Prior Publication Data

US 2009/0080843 A1 Mar. 26, 2009

Related U.S. Application Data

(60) Provisional application No. 60/962,717, filed on Jul. 31, 2007.

(51) Int. Cl.
*G02B 6/032* (2006.01)
(52) U.S. Cl. .................. 385/125; 385/11; 385/123; 385/124; 385/126; 385/127; 385/128; 385/141; 385/142; 385/143; 385/144; 385/145
(58) Field of Classification Search ............. 385/11, 385/123–128, 141–145
See application file for complete search history.

(56) References Cited

U.S. PATENT DOCUMENTS

| | | | | |
|---|---|---|---|---|
| 4,830,463 A | * | 5/1989 | Lemaire et al. | 385/123 |
| 4,838,916 A | | 6/1989 | Edahiro et al. | 65/3.11 |
| 5,452,394 A | * | 9/1995 | Huang | 385/123 |
| 6,459,838 B1 | * | 10/2002 | Varner | 385/123 |
| 6,483,973 B1 | * | 11/2002 | Mazzarese et al. | 385/123 |
| 6,538,807 B2 | * | 3/2003 | Kakui et al. | 359/341.5 |
| 7,062,137 B2 | * | 6/2006 | Farroni et al. | 385/123 |
| 7,110,647 B2 | * | 9/2006 | Farroni et al. | 385/123 |
| 7,412,142 B2 | * | 8/2008 | Chen et al. | 385/125 |

OTHER PUBLICATIONS

"Polarization-Maintaining Fibers and Their Applications"; Noda, et al; Journal of Lightwave Technology; vol. Lt-4; No. 8; Aug. 1986; p. 1071-1089.
"General Solutions for Stress-Induced Polarization in Optical Fibers"; Tsai et al; Journal of Lightwave Technology; vol. 9, No. 1; Jan. 1991; p. 7-17.

* cited by examiner

*Primary Examiner*—Brian M. Healy
*Assistant Examiner*—Guy G Anderson
(74) *Attorney, Agent, or Firm*—Svetlana Z. Short

(57) ABSTRACT

An optical fiber, comprising: (i) a core having a core center and a radius or a width a, (ii) a cladding surrounding the core, and (iii) at least one stress member situated proximate to the fiber core within the cladding, said stress member comprising silica co-doped with F and at least one dopant selected from the list consisting of: $GeO_2$, $P_2O_5$, $Y_2O_3$, $TiO_2$ and $Al_2O_3$, wherein distance b between the stress member and the core center satisfies the following equation: $1 \leq b/a < 2$.

20 Claims, 8 Drawing Sheets

POLARIZATION MAINTAINING AND SINGLE POLARIZATION OPTICAL FIBER

This application claims the benefit of U.S. Provisional Application No. 60/962,717 filed Jul. 31, 2007, entitled "Polarization Maintaining and Single Polarization Optical Fiber".

BACKGROUND OF THE INVENTION

1. Field of the Invention

The present invention relates generally to optical fiber, and more particularly to a polarization maintaining and/or single polarization optical fiber.

2. Technical Background

Polarization maintaining (PM) and single polarization (SP) optical fibers are useful for ultra-high speed transmission systems and many other applications. One type of prior polarization maintaining fiber includes, as shown in FIG. 1, a central core 10 surrounded by a cladding 11. Core 10 and cladding 11 are formed of conventional materials employed in the formation of optical waveguides. The refractive index of the core material is greater than that of the cladding material. By way of example only, core 10 may consist of silica containing one or more dopants which increase the refractive index thereof, such as germania. Cladding 11 may comprise pure silica, silica containing a lesser amount of dopant than core 10, or silica containing one or more down dopants, at least one of which is an oxide of an element such as boron or fluorine which lowers the refractive index of silica. In FIG. 1, diametrically opposed relative to core 10, are two stress rods 12 formed of silica doped only with $B_2O_3$ concentration being 20 to 25 wt %. These Boron (B) doped regions have a coefficient of thermal expansion (CTE) different from that of cladding material 11. When such a fiber is drawn, the longitudinally-extending stress rods 12 and the cladding regions will shrink different amounts, whereby stress rods 12 will be put into a state of tension or compression depending upon the CTE thereof relative to that of the cladding 11. A strain induced birefringence, which is thus induced by anisotropic thermal stress induced by the mismatch of CTEs between stress rods 12 and the surrounding regions 11, reduces coupling between the two polarized fundamental modes (with orthogonal polarization directions). However, B doped stress rods contribute to fiber attenuation. In order to avoid high fiber attenuation, it is known that the stress rods should be placed relatively large distance away from the fiber core.

Another approach is to manufacture the stress rods from either $GeO_2$, $P_2O_5$, or $Al_2O_3$ because they introduce relatively large amount of stress into the fiber. However, although there materials contribute to significant amount of stress effect, and thus birefringence, they increase refractive indices of the rods, raising the refractive index of the stress rods higher than the fiber cladding which is typically formed of pure silica. A higher index stress rod 12 can act as an additional waveguiding core, which is not desirable.

In order to take the advantage of the higher stress induced birefringence by $GeO_2$, $P_2O_5$, or $Al_2O_3$ while avoiding the unwanted wave-guiding effect, additional index lowering dopant (i.e., Boron or Fluorine) is introduced into the stress rods. However, it was believed that, in order to keep the fiber loss within acceptable range, such stress rods (or stress members) have to a relatively large distance b away from the core, which necessitated high amount of dopants to produce sufficient birefringence.

SUMMARY OF THE INVENTION

One aspect of the present invention relates to an optical fiber comprising: (i) a core having a core center and a radius a, (ii) a cladding surrounding the core; and (iii) at least one stress member situated proximate to the fiber core within the cladding. The stress member comprises silica co-doped with F and at least one dopant selected from the list consisting of: $GeO_2$, $P_2O_5$, $Y_2O_3$, $TiO_2$, and $Al_2O_3$, wherein distance b between the stress member and the core center satisfies the following equation: $1 \leq b/a < 2$. Preferably, the optical fiber supports polarization maintenance within an operating wavelength range of 600 nm to 1600 nm (e.g., 850 nm, 1060, 1310, and/or 1550 nm). Preferably the fiber has birefringence ($\Delta n$) between $1 \times 10^{-4}$ and $6 \times 10^{-4}$ at a wavelength situated between 600 nm and 1600 nm.

In one embodiment, the central core is surrounded by this stress member. In another embodiment, the stress member includes least two stress-applying parts (SAPs) such as stress rods situated on opposite sides of the core.

The fiber core preferably has a delta %, $\Delta_1$, of between about 0.03% and 2.5%. For example, the core preferably has a delta %, $\Delta_1$, of between about 0.05% and 0.15% for large-mode-area (LMA) PM fibers, for applications where nonlinearity is major impairment or concern such as in high-power fiber lasers, and air-borne-high-precision fiber Gyros etc. In single-mode fibers for use in telecommunications and fiber sensors, the central core delta %, $\Delta_1$ is preferably of between about 0.2% to 2.5%. By LMA fibers we mean optical fibers that have core diameters of over 20 microns, for example between 20 and 60 microns. Other fiber embodiments disclosed herein are, for examples single-mode fibers with core diameters of about 3 to 15 microns.

Additional features and advantages of the invention will be set forth in the detail description which follows, and in part will be readily apparent to those skilled in the art from that description or recognized by practicing the invention as described herein, including the detailed description which follows, the claims, as well as the appended drawings.

DETAILED DESCRIPTION OF THE PREFERRED EMBODIMENTS

For purposes of the description herein, it is to be understood that the invention may assume various alternative configurations, except where expressly specified to the contrary. It is also to be understood that the specific fibers illustrated in the attached drawings, and described in the following specification are exemplary embodiments of the inventive concepts defined in the appended claims. Hence, specific dimensions and other physical characteristics relating to the embodiments disclosed herein are not to be considered as limiting.

Definitions: The following definitions and terminology are commonly used in the art.

Refractive index profile—the refractive index profile is the relationship between the refractive index ($\Delta\%$) and the optical fiber radius (as measured from the centerline of the optical fiber) over a selected segment of the fiber.

Relative refractive index percent $\Delta\%$—the term $\Delta\%$ represents a relative measure of refractive index defined by the equation:

$$\Delta\% = 100 \times (n_i^2 - n_c^2)/2n_i^2$$

where $n_i$ is the maximum refractive index of the index profile segment denoted as i, and $n_c$, the reference refractive index. Every point in the segment has an associated relative index measured relative to the reference refractive index.

The optical waveguide fiber 20 in accordance with the embodiments of the present invention is a PM and/or SP fiber that utilizes one or more stress applying part(s) (herein referred to as a stress member) doped with both F and at least one of the following dopants: $GeO_2$, $P_2O_5$, $Al_2O_3$, $Y_2O_3$, and/or $TiO_2$. These stress members may have circular or non circular cross-sections, and may be utilized in many different types of fibers, for example: active (e.g., rare earth doped core) and passive fibers, fibers that have one or more claddings of different materials (e.g., double clad fibers), and large-mode-areas (LMA) fibers, etc. The stress member(s) are located proximate to the core, preferably less than 8 μm, more preferably less than 5 μm and even more preferably less than 3 μm away from the edge of the core (wall to wall separation between the core and the stress member). For example, the stress member may be in physical contact with a core. The stress member(s) has coefficient of thermal expansion CTE between $9 \times 10^{-7}/°$ C. and $30 \times 10^{-7}/°$ C. In some of the embodiments the CTE was between $10 \times 10^{-7}/°$ C. and $25 \times 10^{-7}/°$ C. Some exemplary CTE values are $12 \times 10^{-7}/°$ C.m $15 \times 10^{-7}/°$ C., and $20 \times 10^{-7}/°$ C.

Figure 1:
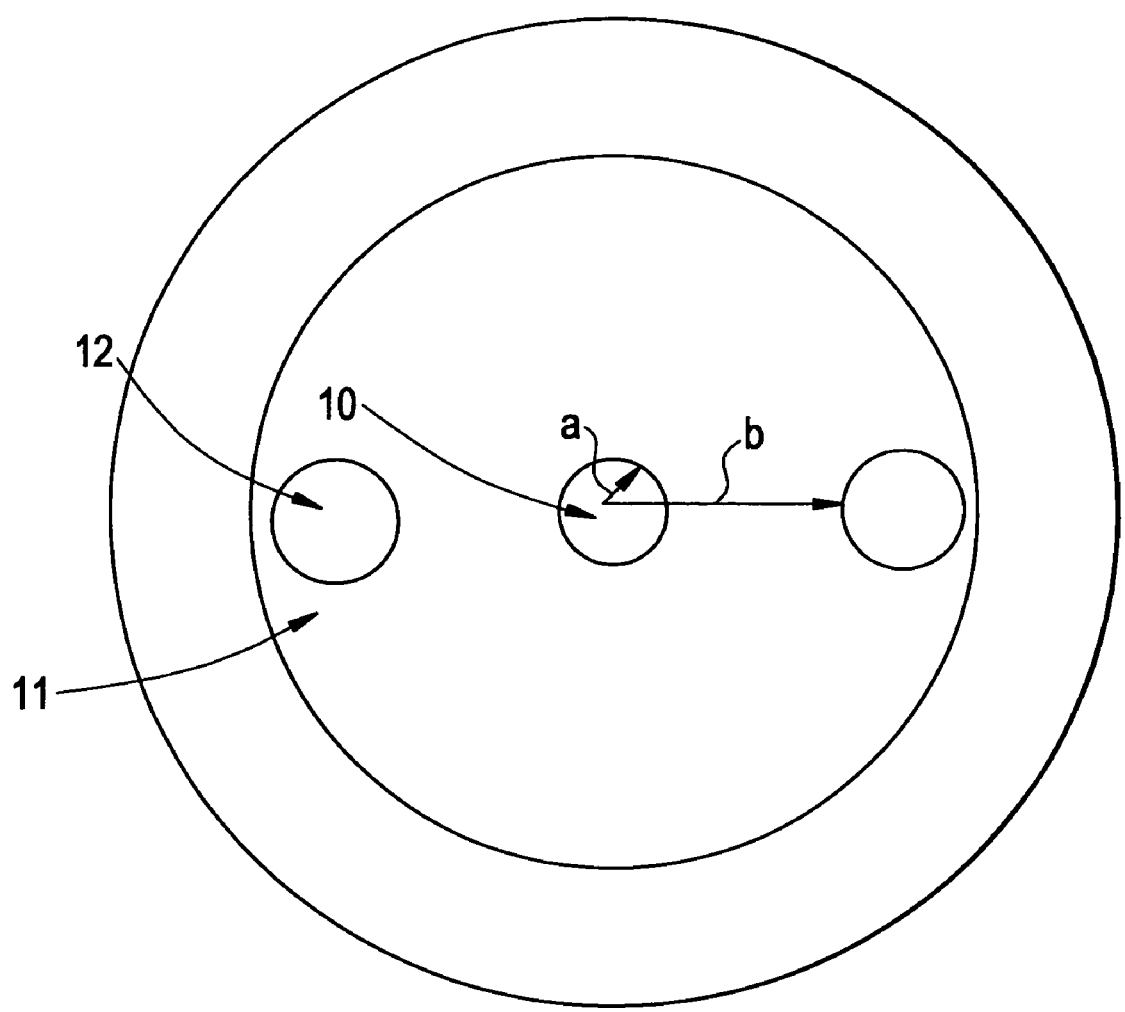
FIG. 1 is a schematic cross-sectional view of an optical waveguide of the prior art.
Figure 2A:
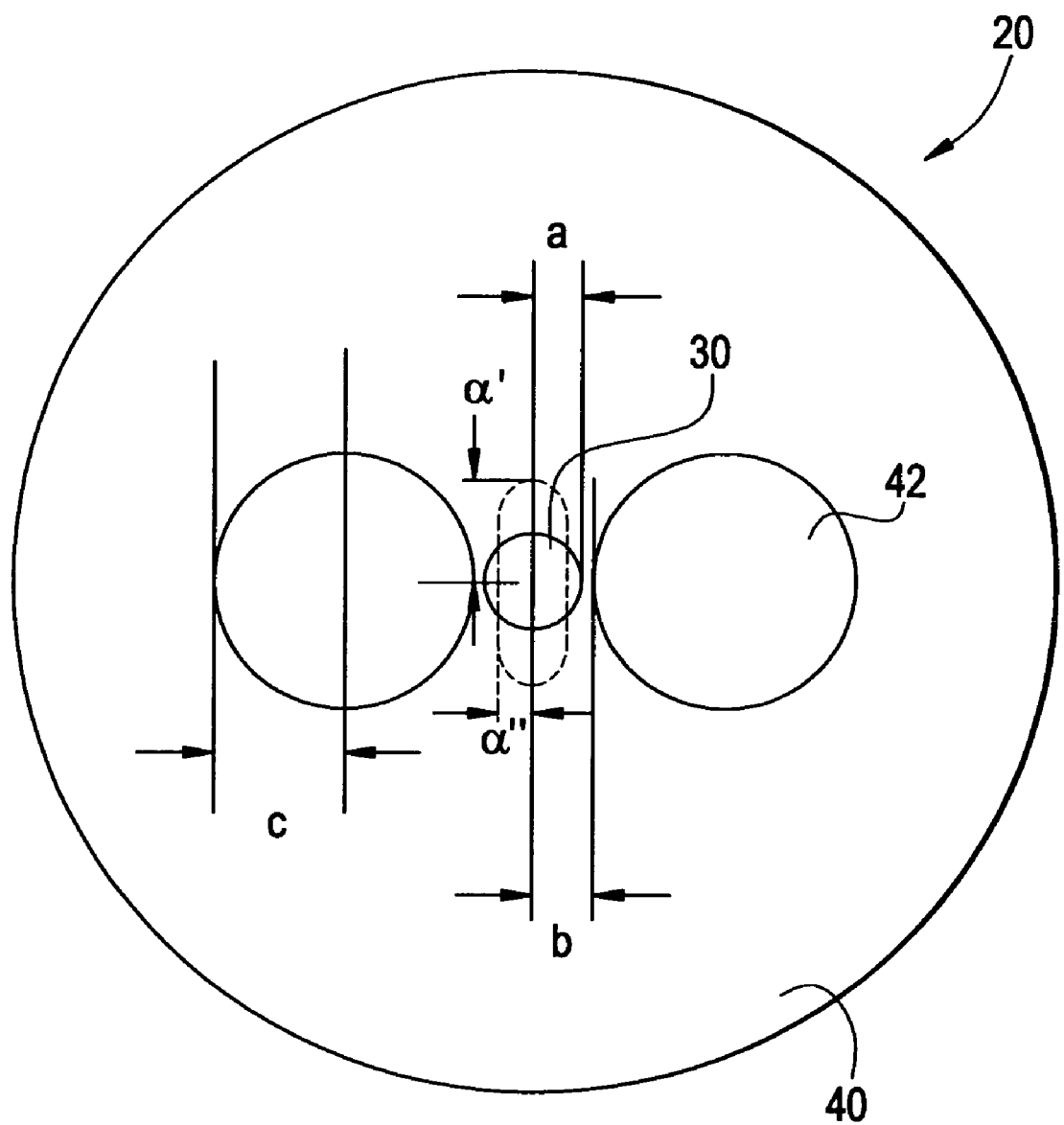
FIG. 2A is a schematic cross-sectional view of a first embodiment of the polarization maintaining optical fiber in accordance with the present invention.

A first embodiment of the polarization maintaining or single polarization optical waveguide fiber 20 in accordance with the invention described and disclosed herein has a cross-sectional structure, as shown in FIG. 2A. (In single polarization fibers stress member(s) contribute to the single polarization operation between the fundamental mode cutoff wavelengths of the two polarization modes. These fibers operate in a single polarization band, SPB, which in the embodiments of the present invention is situated within the 800 nm-1600 nm wavelength range. The SPB is a wavelength range where light propagations in only one polarization mode, and all other polarizations modes are eliminated.) In the illustrated embodiment, the optical waveguide fiber 20 includes a center core 30 extending along the longitudinal axis of the fiber. This core 30 may be either (i) circular (solid outline), with typical diameters between 3 and 15 microns, or (ii) elongated, e.g. elliptical, (dashed outline) with a maximum dimension, a', and a minimum dimension, a", such that its average radius a is a=(a'+a")/2. For polarization maintaining fiber, the core is typically essentially circular. For single polarization fibers, which may have also have air holes 25 situated inside the cladding (see FIG. 2B for example), the dimension of the core along the line connecting the centers of the air holes can be smaller than the longer core dimension. In a fiber that contains elongated core and the air holes, it is preferable to place the stress rods such that the centers of the stress rods are, i.e. along the line the maximum dimension a'. It is preferable that fiber 20 exhibits a first aspect ratio, AR1, defined as a'/a", between 1 and 5; more preferably between 1 and 3. The core 30 is surrounded by the fiber cladding 40 which includes and/or surrounds at least one stress member 42.

Core 30 is manufactured, for example, from germania-doped silica, wherein germania is provided in a sufficient amount such that the core exhibits a core delta %, $\Delta_1$, between about 0.03% and 2.5%; for example preferably between about 0.3% and 1.3%; and in at least one embodiment about 0.35%. If the fiber is a large mode area (LMA) fiber, it is preferable that the core delta %, $\Delta_0$, be between about 0.05% and 0.15%; and more preferably between about 0.07% and 0.11%; for example 0.1%. If the core is elongated, an average radius a of the core 30 is preferably between about 3 and 12 microns; more preferably between 4 and 10 microns.

One exemplary fiber with a cross-section similar to that shown FIG. 2A has a core relative refractive index delta of 0.35% and pure silica cladding. The fiber core 30 of this exemplary fiber comprises $GeO_2$: 7.6 wt %. The fiber cladding 40 preferably has a conventional outer diameter of about 125 microns or more. Optionally, cladding 40 may include other suitable dopants, such as fluorine, and the outer diameter may be reduced, if size constraints so dictate.

Figure 2B:
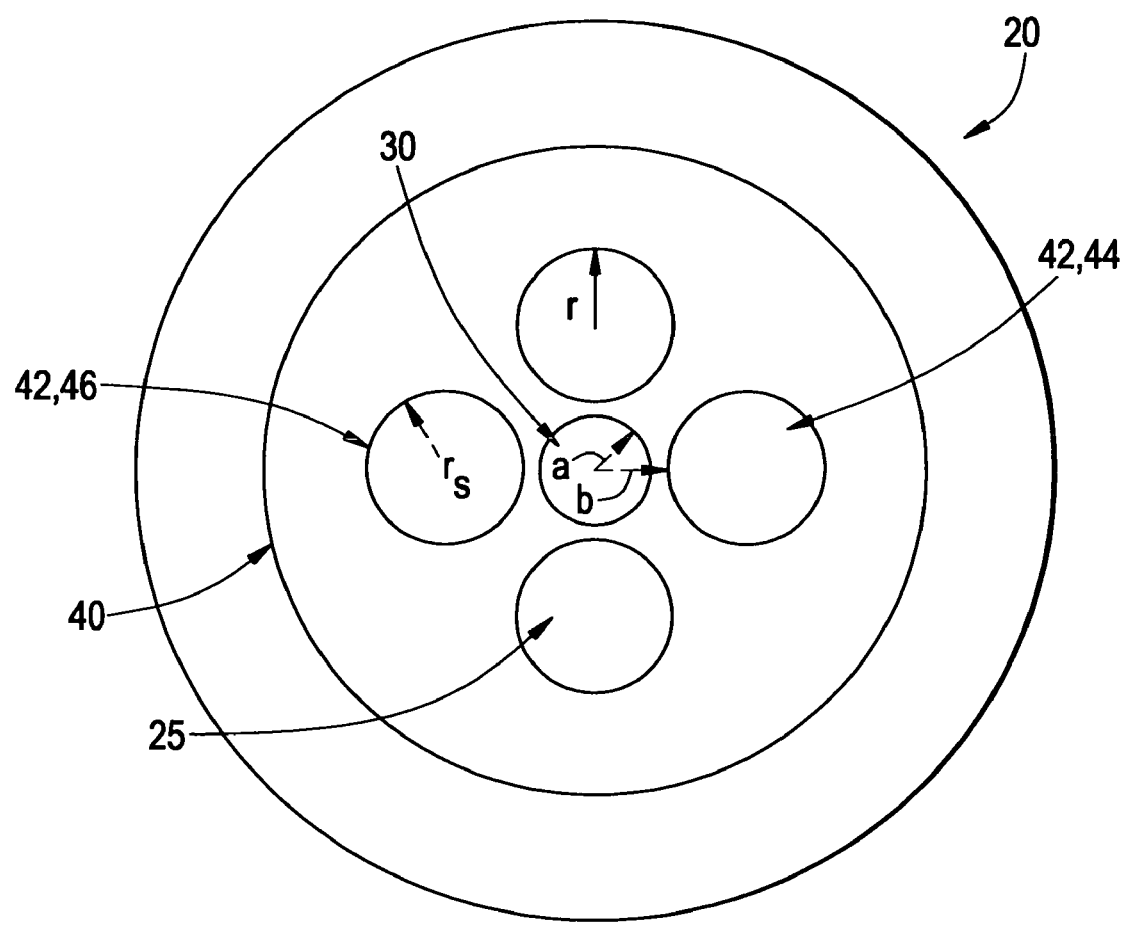
FIG. 2B is a schematic cross-sectional view of a first embodiment of the single polarization fiber in accordance with the present invention.
Figure 2C:
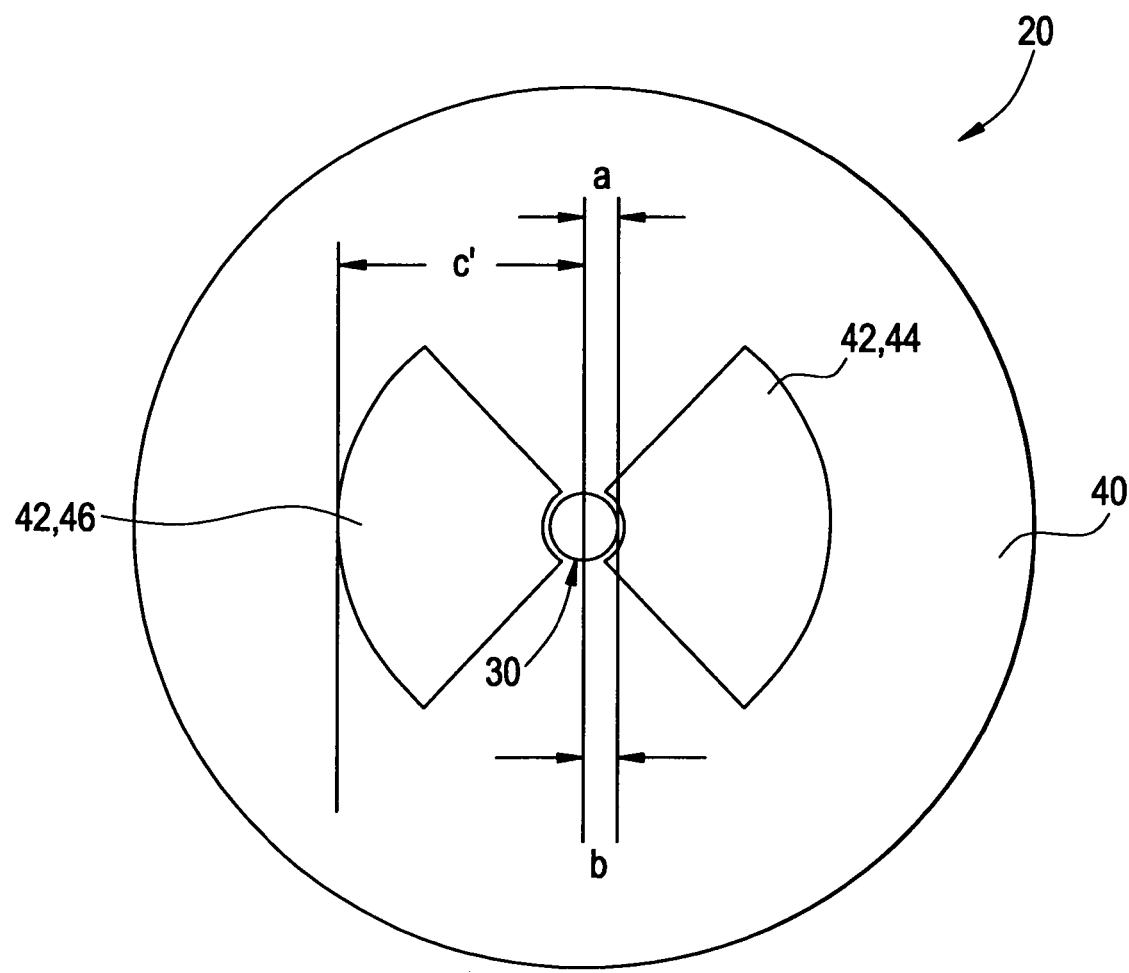
FIG. 2C is a partial schematic cross-sectional view of a second embodiment of the polarization maintaining optical fiber in accordance with the present invention.
Figure 2D:
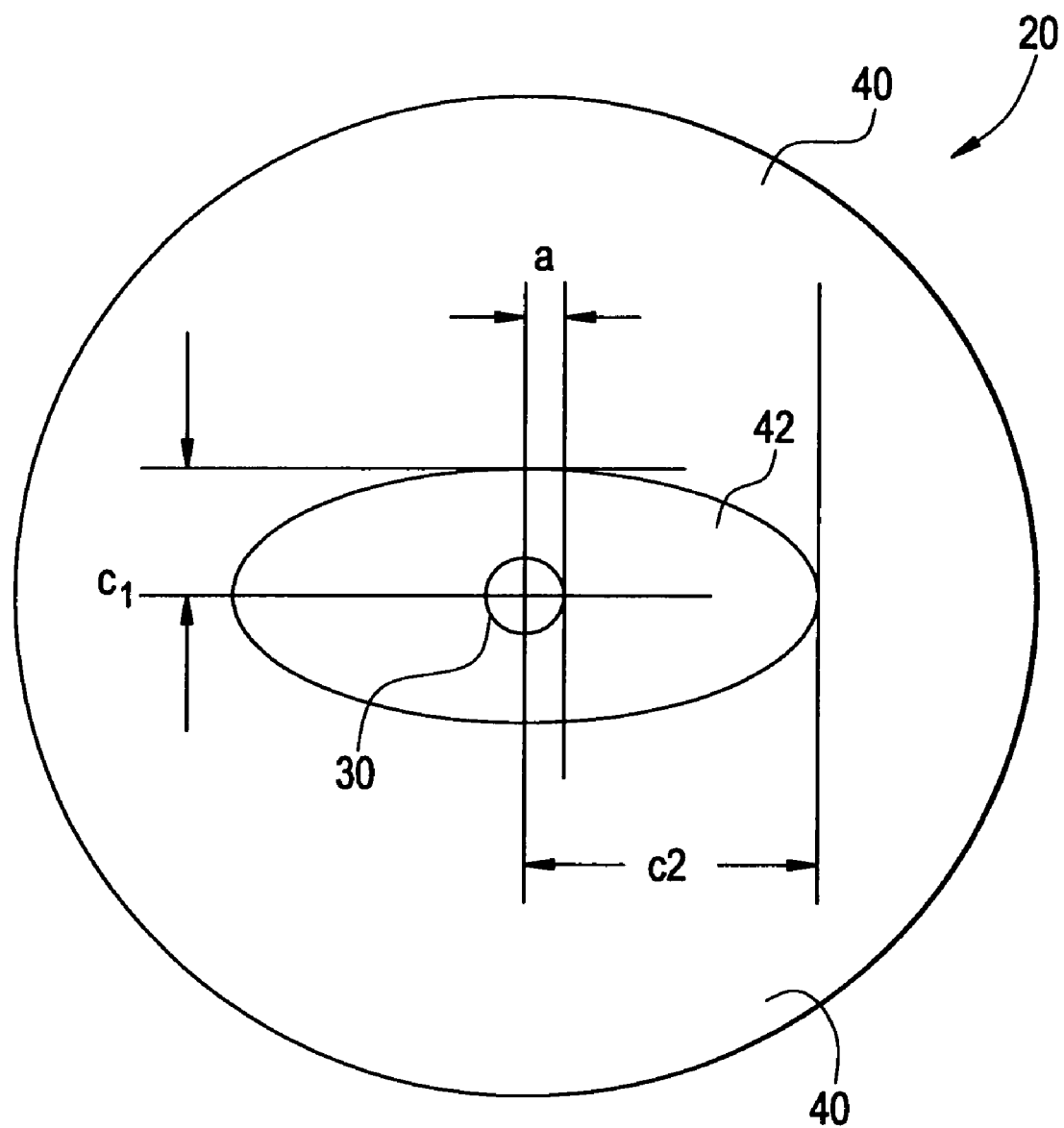
FIG. 2D is a schematic cross-sectional view of a third embodiment of the polarization maintaining optical fiber in accordance with the present invention.

As shown in FIGS. 2A, 2B and 2C, the stress member 42 may comprise at least two stress rods 44, 46. The stress rods 44, 46 may be circular in cross-section (FIG. 2A), crescent shaped (e.g, half circles), or may have bow-tie-geometry (FIG. 2C). Alternatively, the core 30 may be surrounded by a stress member 42. The stress member 42 surrounding the core 30 may have a generally circular or oval shape as shown in FIG. 2D. As discussed above, the stress member 42 is formed proximate or adjacent to the core 30 (FIGS. 2A-2D), or in physical contact with the core. If the stress member includes stress rods, the stress rods 44, 46 are situated on opposite sides of the core 30. The stress rods 44, 46 are preferably extend along the entire longitudinal length of the fiber 20, and are preferably of substantially constant dimension along the fiber length. The stress rods 44, 46 are preferably positioned diametrically on opposite sides of the center core 30 within the cladding 40 as shown in FIGS. 2A, 2B, 2C. The stress rods 44, 46 may be positioned directly adjacent (in physical contact) to the core. That is, the core and the stress rods can in contact with one another. Preferably the stress member, such as the stress rods 44, 46 are situated adjacent to and in very close proximity to the core 30 for example, having a stress rod edge located within 5 microns, more preferably within 4 microns, and even more preferably within 3 microns from the edge of core 30. In some embodiments the stress rods are situated 0 μm to 2 μm away from the core (wall-to-wall separation). Preferably, the distance b between the closest wall of the stress member 42, 44, 46 and the core's center satisfies the following equation: $1 \leq b/a < 2$. For example, the distance b in fiber of FIG. 2D is equal to the core radius a, so that b/a=1. The stress rod cross-section may be circular (FIG. 2A), but may optionally be of other shapes (see, for example, FIG. 2C) and the stress rods may be of equal or non-equal sizes. In fibers designed for standard single mode applications (e.g., fibers with outer diameter (OD) of 125 µm), the stress member(s) preferably have a maximum dimension, such as in diameter $d_s$ or width w of between about 1 to 35 microns; more preferably between about 5 µm and 25 microns, for example 5 or 10 microns to 20 microns, 10 to 15 microns or 10 to 20 microns. For large outer diameter (OD) LMA fibers, the diameter or width of the stress member can often be up to 30 microns and greater, depending on the application-specific LMA fiber design requirement. For example, the maximum stress rod dimension may be 25 µm to 250 µm for the LMA fiber. An LMA fiber, with 250 µm diameter (or width) stress member may have, for example an outer diameter OD of about 1 mm. Although only one stress rod is shown on each side of the core 30, multiple stress rods along each side may also work to provide polarization maintenance within the operating wavelength band (800 nm-1600 nm). Exemplary silica based stress members may include less than 3 wt % (for example, less than 2 wt %) of fluorine. The stress member(s) will also be co-doped with 2 mole % to 15 mole % of dopant(s) selected from: $GeO_2$, $P_2O_5$, $Al_2O_3$, or a combination thereof. For example, in some embodiments the stress member may include 1.5 wt %<F<2.7 wt % and either less than 10 wt % of $GeO_2$, or 12 wt % or less of $P_2O_5$.

The thermal expansion coefficient ($\alpha$) in the unit of 1/° C. is related to the dopant's concentration in molar percent by the following equations:

$$\alpha_{GeO2}(M_{GeO2}) = \alpha_{silica} + \Delta\alpha_{GeO2} = 5.4 \times 10^{-7} + 1.15 \times 10^{-7} M_{GeO2} \quad (5)$$

$$\alpha_{P2O5}(M_{P2O5}) = \alpha_{silica} + \Delta\alpha_{P2O5} = 5.4 \times 10^{-7} + 1.71 \times 10^{-7} M_{P2O5} \quad (6)$$

$$\alpha_F(M_F) = \alpha_{Silica} + \sum_{i=1}^{4} a_i M_F^i \quad (7)$$

where $\alpha_1 = -1.404 \times 10^{-7}$/° C., $\alpha_2 = 5.092 \times 10^{-8}$ 1/° C., $\alpha_3 = -1.666 \times 10^{-8}$ 1/° C., $\alpha_4 = 1.987 \times 10^{-9}$ 1/° C. (Similar equations may be written for $Al_2O_3$, $Y_2O_3$, and/or $TiO_2$.) $M_{GeO2}$ and $M_{P2O5}$ are molar concentrations of $GeO_2$ and $P_2O_5$, respectively, and $M_F$ is concentration of the Fluorine, in mole %. For typical molar concentration of the dopant (e.g., $GeO_2$, $P_2O_5$ and/or $Al_2O_3$), which is relatively small (less than 25 mole %), the thermal expansion coefficient $\alpha$ can also be estimated by a linear addition of the dopant contents along with the contribution from the pure silica.

Figure 3:
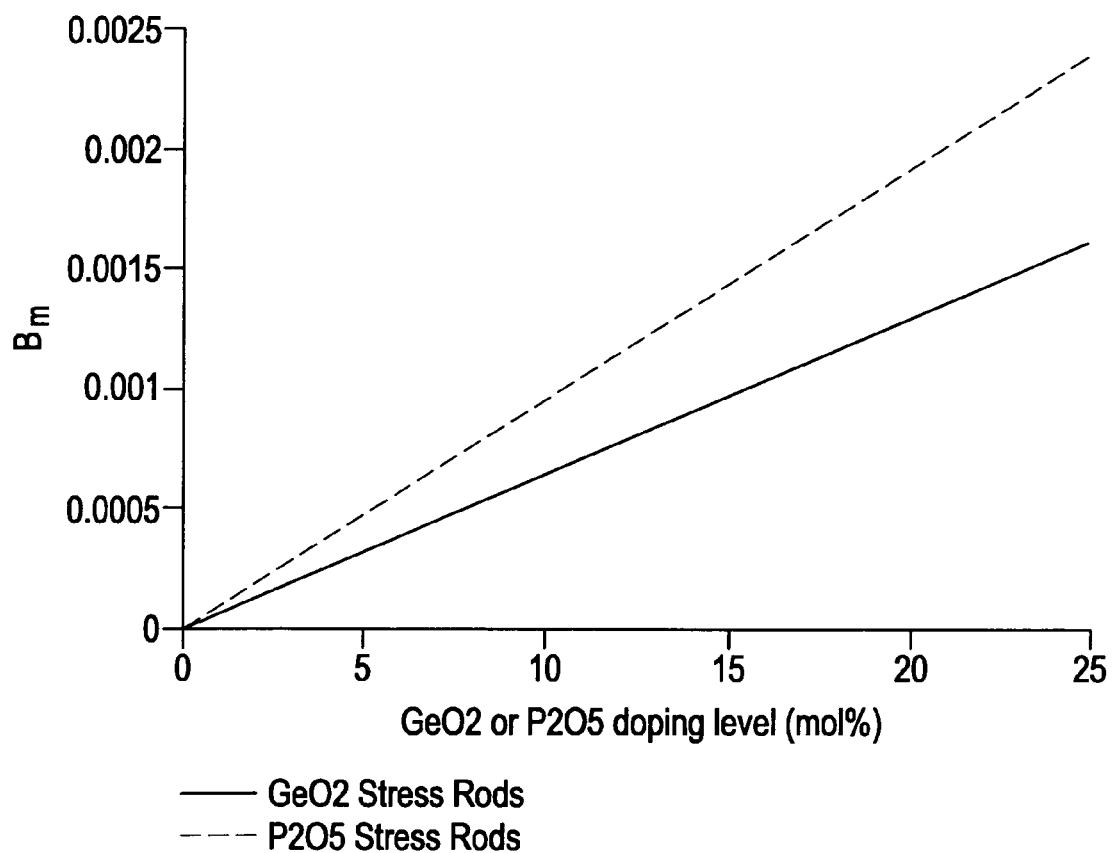
FIG. 3 is a plot of material birefringence ($B_m$) of the stress rods vs $GeO_2$ and $P_2O_5$ dopant levels (mole %).
Figure 4:
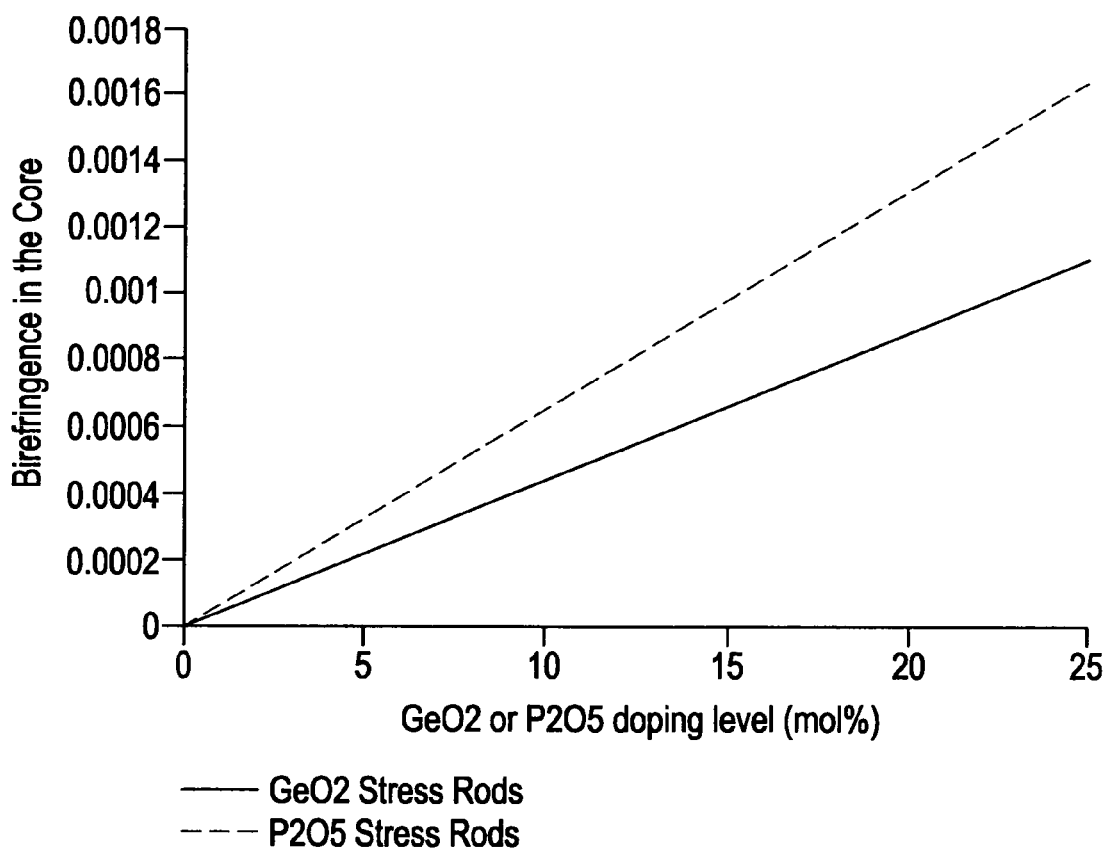
FIG. 4 is a plot of core birefringence vs. dopant levels, in mole %, of $GeO_2$ and $P_2O_5$ stress rods.

Preferably, the optical fiber supports polarization maintenance within an operating wavelength range situated between 800 nm and 1600 nm (e.g., 850 nm, 1060 nm, 1310 nm, and/or 1550 nm wavelength(s)). It is noted that the polarization maintaining property of the fiber can be characterized by fiber's birefringence $\Delta n$ at a specified wavelength. The optical fibers according to some embodiments of the present invention exhibit birefringence ($\Delta n$) of $0.4 \times 10^{-4}$ to $7 \times 10^{-4}$ at a wavelength of 600 nm to 1600 nm. For example, $\Delta n$ may be between $1 \times 10^{-4}$ to $6.5 \times 10^{-4}$ at a wavelength(s) of 980 nm and/or 1550 nm. In some embodiments, we utilize $GeO_2$ to provide stress birefringence. In other embodiment, we utilize $P_2O_5$ as dopant material for in stress members. $Al_2O_3$, $Y_2O_3$, and/or $TiO_2$ may also be utilized. FIG. 3 shows the material birefringence $B_m$ from the two dopants ($GeO_2$ and $P_2O_5$) as a function of the dopant concentration. The modeled fiber is similar to that shown in FIG. 2A, but with stress rods 44, 46 in physical contact with the core 30, and a=b=4.2 µm. The radius of the stress rods of the modeled fiber is 12 µm. For example, FIG. 3 illustrates this fiber has material birefringence $B_m$ (material birefringence is birefringence due to CTE mismatch only, without taking material geometry into account) from just over 0 to 0.0025, depending on the level of dopant present in the stress rods 44, 46. FIG. 3 also shows that with a few molar percent of the dopant concentration, the material birefringence $B_m$ can reach the level of $10^{-4}$ or above for a wavelength situated within 600 nm to 1600 nm wavelength range. The material birefringence is directly translated into the fiber core birefringence ($\Delta n$). Fiber core birefringence ($\Delta n$) for PM fibers that correspond to the FIG. 3 is illustrated in the FIG. 4.

Because both $GeO_2$ doped silica and the $P_2O_5$, as well as $Al_2O_3$ doped silica rods have higher refractive index than pure silica, unwanted waveguides can be formed in the stress rod region. In order to avoid the unwanted waveguide function within the stress rods we utilize fluorine together with $GeO_2$, $P_2O_5$ and/or $Al_2O_3$. With the proper co-doping levels of the $GeO_2$ or $P_2O_5$ or $Al_2O_3$ with Fluorine, the overall refractive index in the stress rods can be equal or lower than the refractive index of the pure silica. Since the additional change on the thermal expansion due to the amount of fluorine used to counter the index raising dopants ($GeO_2$, and/or $P_2O_5$, and/or $Al_2O_3$) than that contributed by these dopants is a few times smaller, the birefringence contribution from $GeO_2$ or/and $P_2O_5$ and/or $Al_2O_3$ is the dominant contribution to the fiber core birefringence. Applicants also discovered that the combination of these co-dopants in the stress rods does not produce fiber losses thought to be present by those of ordinary skill in the art. The placement of the stress rods close to the core advantageously resulted in higher birefringence, without the need for larger amounts of $GeO_2$ and/or $P_2O_5$, and/or $Al_2O_3$. Thus, the benefit of having an optical fiber with F plus $GeO_2$ or $P_2O_5$ or and/or $Al_2O_3$ codoped rods situated near the core is large birefringence while maintaining low loss (e.g., less than 2.0 dB/km, preferably less than 0.5 dB/km at 1550 nm, and in some embodiments less than 0.3 dB/km at 1550 nm).

Figure 5:
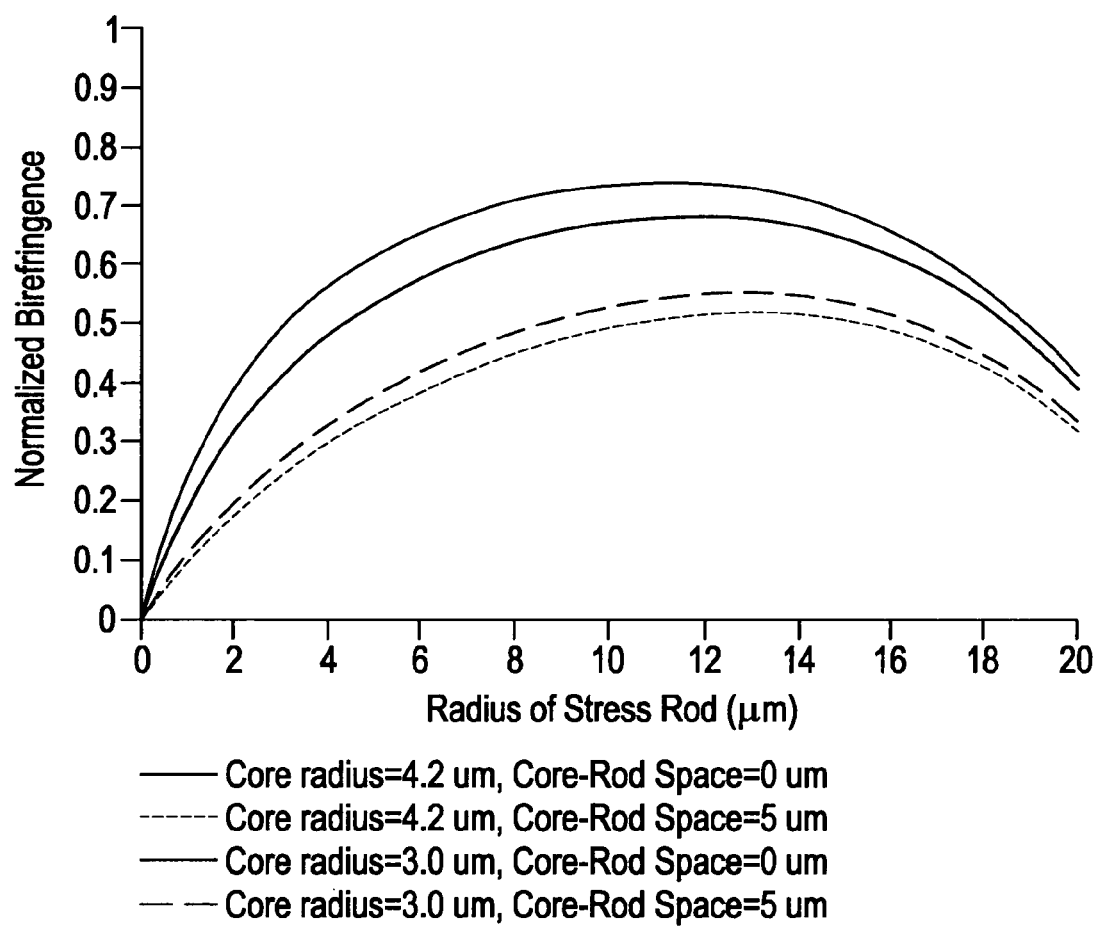
FIG. 5 is the normalized birefringence as a function of the radius of the stress rod(s) for a different core radii and rods-core separations.

The dimension of a stress rod(s) can also affect the birefringence level of the polarization maintaining (PM) fiber. To quantify that effect, we use normalized birefringence, which is defined by the ratio of total birefringence to the material birefringence. The normalized birefringence is related only to the geometry effect. In FIG. 5, we show the normalized birefringence as a function of stress rod radius for several core radius and core-stress rod separation configurations for the PM fibers of the type shown in FIG. 2A. We found that the optimal birefringence can be achieved when the stress rod radius is between 5 and 17 microns. The stress members 42 (e.g., stress rods 44, 46) are placed sufficiently close to the core of the fiber (see, for example, FIGS. 2A, 2B and 2C) such that $1 \leq b/a < 2$, or with elliptical cladding surrounding the core and in physical contact with the core, as shown in FIG. 2D.

EXAMPLES

In the following embodiments, we show a few design examples that utilize either $GeO_2$—F co-doped stress rods or $P_2O_5$—F co-doped stress rods. The fibers parameters are provided in Tables 1-3. In these examples, we have considered PM fibers that provide polarization maintenance at 980 nm or 1550 nm wavelengths. In order to maintain the single mode performance at these wavelengths, the core sizes of these examples are adjusted so that at 980 nm or 1550 nm the fibers are single moded. The composition of the stress rods was chosen so that the stress effects is sufficient large and the proper amount of F is used to preferably bring the refractive index below that of the pure silica.

TABLE I

Modeling results of several examples of PM fibers with two stress rods of circular cross-sections.

|  | Core radius (um) | Core Delta (%) | Stress Rod Radius (um) | Core-Rod Seperation b-a (um) | Rod composition | Birefringence | Wavelength (nm) |
|---|---|---|---|---|---|---|---|
| Fiber 1 | 4.2 | 0.35 | 11 | 0 | $GeO_2$: 8.0 mol % F: 2.64 wt % | 1.91E−04 | 1550 |
| Fiber 2 | 4.2 | 0.35 | 11 | 0 | $P_2O_5$: 12 mol % F: 1.77 wt % | 5.67E−04 | 1550 |
| Fiber 3 | 2.9 | 0.35 | 11 | 0 | $GeO_2$: 8.0 mol % F: 2.64 wt % | 2.06E−04 | 980 |
| Fiber 4 | 2.9 | 0.35 | 11 | 0 | $P_2O_5$: 12 mol % F: 1.77 wt % | 6.11E−04 | 980 |
| Fiber 5 | 2.9 | 0.35 | 11 | 2 | $P_2O_5$: 12 mol % F: 1.77 wt % | 4.88E−04 | 980 |
| Fiber 6 | 2.9 | 0.35 | 11 | 7 | $GeO_2$: 8.0 mol % F: 2.64 wt % | 9.50E−05 | 980 |

In these examples we consider the PM fibers with the stress rods placed adjacent to the two opposite sides of the core 30. The stress rods have circular cross-section, similar to that depicted in FIG. 2A. The dimensions of the cores and stress rods and their separation from one another are provided in Table I (see FIG. 2A). These type of PM fibers can have birefringence between $0.8 \times 10^{-4}$ and $6.5 \times 10^{-4}$, and preferably over $1 \times 10^{-4}$. By comparing the results of shown in Table I, one can learn that by moving the stress rods away from the fiber center, the fiber birefringence would decrease to a level that PM performance may not be sufficiently good, for example less than $1.0 \times 10^{-4}$. Accordingly, it is preferable that the stress rods are located proximate to the fiber core, such that $1 < b/a < 2$.

TABLE II

Modeling results of several examples of Bow-Tie rod geometry PM fibers

|  | Core radius (um) | Core Delta (%) | Bowtie b (um) | Bowtie c (um) | Rod composition | Birefringence | Wavelength (nm) |
|---|---|---|---|---|---|---|---|
| Fiber 7 | 4.2 | 0.35 | 4 | 30 | $GeO_2$: 8.0 mol % F: 2.64 wt % | 2.18E−04 | 980 |
| Fiber 8 | 4.2 | 0.35 | 4 | 30 | $P_2O_5$: 12 mol % F: 1.77 wt % | 6.41E−04 | 980 |

The exemplary PM fibers also include Bow-tie type PM fibers illustrated in FIG. 2C. The parameters for two exemplary fibers of this configuration are provided in Table II. We have found that with bow-tie stress rod geometry we achieve fiber birefringence between $0.8 \times 10^{-4}$ and $7.0 \times 10^{-4}$ at the operating and/or measurement wavelength(s) situated within 600 to 1600 nm wavelength range. Preferably the fiber birefringence is $2 \times 10^{-4}$ and $7.0 \times 10^{-4}$. For example, fibers 7 and 8 of Table II have birefringence values of about $2.2 \times 10^{-4}$ and $6.4 \times 10^{-4}$ at the wavelength of 980 nm, respectively. The b/a ratio of these exemplary fibers is $1 < b/a < 2$.

TABLE III

Modeling results of a PM fibers with a stress member surrounding the core.

|  | Core radius (um) | Core Delta (%) | E-Cladding Semi-Axis X (um) | E-Cladding Semi-Axis Y (um) | Rod composition | Birefringence | Wavelength (nm) |
|---|---|---|---|---|---|---|---|
| Fiber 9 | 4.2 | 0.35 | 30 | 6 | $GeO_2$: 8.0 mol % F: 2.64 wt % | 1.16E−04 | 980 |
| Fiber 10 | 4.2 | 0.35 | 30 | 6 | $P_2O_5$: 12 mol % F: 1.77 wt % | 3.42E−04 | 980 |

In these examples, we consider PM fibers with an elliptical stress member 42 in contact with and surrounding a circular core 30. (See, for example, FIG. 2D.) Exemplary fibers with $GeO_2$—F and $P_2O_5$—F co-doped stress members have been considered. The modeled embodiments of this type had fiber birefringence over $1.0 \times 10^{-4}$ measurement wavelength(s) situated within 600 nm-1600 nm wavelength range, for example between $1.05 \times 10^{-4}$ and $4.0 \times 10^{-4}$. The two fibers examples tabulated above, (Fibers 9 and 10) have fiber birefringence of $1.2 \times 10^{-4}$ and $3.4 \times 10^{-4}$, respectively.

Although in the above fiber examples (Tables I, II and III) we have chosen either F—$GeO_2$, or F—$P_2O_5$ doping of stress members, alternative designs are also possible. For example, stress members can be doped with both $GeO_2$, and $P_2O_5$ in addition to F. It is noted that both the delta and the coefficient of thermal expansion are linear combination or superposition of the contributions from each composition.

Thus, the optical fibers according to some embodiments of the present invention exhibit birefringence ($\Delta n$) of $0.8 \times 10^{-4}$ to $7 \times 10^{-4}$, more preferably $1 \times 10^{-4}$ to $7 \times 10^{-4}$, and even more preferably $2 \times 10^{-4}$ to $7 \times 10^{-4}$ at a wavelength situated within 600 nm to 1600 nm.

It will be apparent to those skilled in the art that variations and modifications can be made to the present invention without departing from the scope of the invention. Thus, it is intended that the present invention cover the modifications and variations of this invention provided they come within the scope of the appended claims and their equivalents.

What is claimed is:

1. An optical fiber, comprising:
   (i) a core having a core center and a radius a,
   (ii) a cladding surrounding the core, and
   (iii) at least one stress member situated proximate to the fiber core within the cladding, said stress member comprising silica co-doped with F and at least one dopant selected from the list consisting of: $GeO_2$, $P_2O_5$, $Y_2O_3$, $TiO_2$, and $Al_2O_3$,
      wherein distance b between the stress member and the core center satisfies the following equation: $1 \leq b/a < 2$.

2. The optical fiber of claim 1, wherein said core is elliptical.

3. The optical fiber of claim 1 wherein the central core is silica based, and is in contact with and surrounded by said stress member.

4. The optical fiber of claim 1 wherein the stress member includes at least two stress rods situated on opposite sides of said core.

5. The optical fiber of claim 1 further comprising a polarization extinction ratio of greater than equal to 15 at operating wavelength situated in the 600 nm to 1600 nm band.

6. The optical fiber of claim 1, said fiber exhibiting attenuation of less than 0.5 dB/km at operating wavelength situated in the 600 to 1600 nm band.

7. The optical fiber of claim 1 exhibiting birefringence of $0.1 \times 10^{-4}$ to $6.5 \times 10^{-4}$ at a wavelength of 600 nm to 1600 nm.

8. The optical fiber of claim 1 wherein said stress member has 1.5 wt %<F<3.5 wt %, and 2 mole % to 15 mole % of a dopant selected from: $GeO_2$ doped silica, $P_2O_5$, or combination thereof.

9. The optical fiber of claim 8 wherein said stress member has 1.5 wt %<F<2.5 wt %, and 2 mole % to 12 mole % of dopant(s) selected from: $GeO_2$ doped silica, $P_2O_5$, or combination thereof.

10. The optical fiber of claim 8 wherein said stress member has 1.5 wt %<F<2 wt %, and 2 mole % to 12 mole % of dopant(s) selected from: $GeO_2$ doped silica, $P_2O_5$, or combination thereof.

11. The optical fiber of claim 4 wherein said stress rods have a circular cross-section with diameter d, wherein 5 μm<d<20 μm.

12. The optical fiber of claim 4, wherein said fiber is an LMA fiber, and wherein said stress rods have a circular cross-section with diameter ds, wherein and 25 μm<d<250 μm.

13. The optical fiber of claim 1 wherein said stress member has a CTE between $10 \times 10^{-7}/°C$ and $30 \times 10^{-7}/°C$.

14. An optical fiber, comprising:
   (i) a core,
   (ii) a cladding surrounding the core,
   (iii) at least one stress member adjacent the fiber core and situated within the cladding, said stress member comprising silica co-doped with F and at least one other dopant, selected from $GeO_2$, $P_2O_5$, $Y_2O_3$, $TiO_2$, and $Al_2O_3$, wherein the optical fiber exhibits birefringence of $0.1 \times 10^{-4}$ to $7 \times 10^{-4}$ at a wavelength within the range of 600 to 1600 nm.

15. The optical fiber of claim 14 wherein said at least one stress member has 1.5 wt %<F<3 wt % and 2 wt % to 15 wt % of: $GeO_2$ doped silica, $P_2O_5$, or combination thereof.

16. The optical fiber of claim 14 wherein said at least one stress member has a CTE between $10 \times 10^{-7}/°C$ and $30 \times 10^{-7}/°C$.

17. The optical fiber of claim 14, wherein the stress member includes at least two stress rods situated on opposite sides of said core.

18. The optical fiber of claim 14, wherein said fiber is a polarization maintaining fiber for an operating wavelength band situated within 800 to 1600 nm wavelength range.

19. The optical fiber of claim 14, wherein said fiber is a single polarization fiber with a single polarization bend SPB situated within 800 to 1600 nm wavelength range.

20. The optical fiber of claim 14, wherein said core and said at least one stress member are separated by less than 8 μm.

* * * * *